United States Patent [19]

Wyatt

[11] 4,018,707
[45] Apr. 19, 1977

[54] TRANSITION METAL COMPOSITIONS

[75] Inventor: Ronald John Wyatt, Runcorn, England

[73] Assignee: Imperial Chemical Industries Limited, London, England

[22] Filed: July 16, 1974

[21] Appl. No.: 488,939

Related U.S. Application Data

[63] Continuation of Ser. No. 62,185, Aug. 7, 1970, abandoned.

[30] Foreign Application Priority Data

Aug. 13, 1969 United Kingdom ............ 40417/69

[52] U.S. Cl. .............................. 252/430; 252/428; 252/431 R; 526/126; 526/194; 526/348; 526/352
[51] Int. Cl.$^2$ ..................... C08F 4/02; C08F 4/76; C08F 4/78
[58] Field of Search ........... 252/429 B, 431 R, 428, 252/430

[56] References Cited
UNITED STATES PATENTS

| 3,326,877 | 6/1967 | Orzechowski et al. .... 252/431 R X |
| 3,392,160 | 7/1968 | Orzechowski ............. 252/429 R X |
| 3,424,777 | 1/1969 | Wilke ....................... 252/431 R X |
| 3,536,740 | 10/1970 | Wilke ....................... 252/431 R X |
| 3,738,944 | 6/1973 | Candlin et al. ................ 252/431 R |
| 3,932,307 | 1/1976 | Setterquist ..................... 252/431 R |

Primary Examiner—Patrick P. Garvin
Attorney, Agent, or Firm—Cushman, Darby & Cushman

[57] ABSTRACT

Transition metal compositions which are the products of reacting a transition metal complex of the formula RmMXp with a substantially inert matrix material having a hydroxylic surface which is free from adsorbed water, wherein M is a transition metal of Groups IVA to VIA, R is a hydrocarbon group, X is a monovalent ligand and m and p are integers, m having a value from 2 to the highest valency of the metal M and p having a value of from 0 to 2 less than the valency of the metal M, except when M is a metal of Group VIA, when p is 0. When present, ligand X is preferably halogen. The compositions are useful as initiators, particularly for the polymerization of olefinically unsaturated monomers, for example ethylene and propylene.

11 Claims, No Drawings

TRANSITION METAL COMPOSITIONS

This application is a continuation of Ser. No. 62,185, filed Aug. 7, 1970, now abandoned.

This invention relates to transition metal composition in which a transition metal complex is chemically bonded to a substantially inert matrix material.

It is known to adsorb organometallic compounds on inert inorganic materials and to use the combinations produced as polymerisation catalysts or the like. We have now found that certain transition metal organometallic compounds may be reacted with specified matrix materials to give rise to stable chemical entities, many of which may be used as initiators for the polymerisation of olefinically unsaturated monomers.

According to one aspect of the present invention we provide a transition metal composition which is the product of reacting a transition metal complex of the general formula $$R_m MX_p \tag{1}$$

with a substantially inert matrix material having a hydroxylic surface (as hereinafter defined) which is free from adsorbed water, wherein M is a transition metal of Groups IVA to VIA of the Periodic Table of the Elements, R is a hydrocarbon group or substituted hydrocarbon group, X is monovalent ligand, and $m$ and $p$ are integers, $m$ having a value from 0 to 2 less than the valency of the metal M, except when M is a metal of Group VIA when $p$ is always 0.

(All references to the Periodic Table are to the version of the Periodic Table of the Elements printed inside the back cover of "Advanced Inorganic Chemistry" by F. A. Cotton and G. Wilkinson, 2nd Edition, Interscience Publishers, 1966).

The transition metal is preferably selected from Group IVA; and the monovalent ligand X is preferably a halogen. Hydrocarbon groups of different types may be associated with a single metal atom.

Suitable hydrocarbon groups R include alkyl and alkenyl groups (including π-alkenyl groups such as π-allyl) and substituted derivatives thereof. Examples of transition metal complexes include tetrakis (π-allyl) zirconium or hafnium, tris(π-allyl) chromium, tetrakis (π-methallyl) zirconium or hafnium, tris(π-methylallyl) chromium and zirconium tris(π-allyl) bromide.

A preferred class of organic transition metal complexes, many of which are particularly useful as polymerisation initiators, are those in which some or all of the groups, or ligands, R are substituted alkyl groups of general formula $$-CH_2Y \tag{2}$$

σ-bonded to the transition metal through the carbon atoms as indicated. In this general formula Y represents an atom or group capable of interaction with the vacant d-orbitals of the metal M. Preferably all of the groups R have this formula, but it is possible for some of them to comprise other hydrocarbon groups. It will be appreciated that π-allyl ligands, that is, ligands comprising a grouping of 3 carbon atoms similarly bound to a central metal atom in a planar system, are not included within formula (2) above, as X-ray structural analysis has shown ligands of formula (2) to be σ-bonded in our compounds.

Suitable substituent groups Y include aromatic and polyaromatic groups such as phenyl and naphthyl, giving rise, in formula (2) above, to he alkaryl ligands benzyl and (1-methylene-1-naphthyl) and ring substituted derivatives thereof, for example p-methyl benzyl.

Y may also be a cycloalkenyl group, such as a cyclooctenyl group.

Y may also comprise a general formula $$Z(R')_3 \tag{3}$$

where Z represents silicon, germanium, tin or lead, and R' represents a hydrocarbon group or hydrogen; but is preferably an alkyl group.

Examples of this preferred class of transition metal complexes include zirconium and titanium tetra(benzyl), tris(benzyl) zirconium chloride, zirconium tetrakis (p-methyl benzyl), zirconium and titanium tetrakis(1-methylene-1-naphthyl) and zirconium tetrakis(trimethylsilylmethylene).

Examples of complexes containing monovalent ligands X include tris(π-allyl) zirconium chloride, bromide or iodide and the equivalent π-methallyl and benzyl compounds.

By a "hydroxylic surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silicon or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts of other suitable inorganic oxides, such as magnesium oxide and zinc oxide.

It is essential that the matrix material is freed from adsorbed water, as this would merely react with and destroy the transition metal complex. The matrix materials may be readily freed from such adsorbed water by, for example, a simple thermal treatment.

The reaction between the transition metal complex and matrix material comprises displacement of one or more of the hyrdocarbon groups by the hydrogen atom of an —OH group or groups, with liberation of the corresponding free hydrocarbon. The reaction may be represented by the following equation:

$$\text{Matrix } (-OH)_n + M\ R_mX_p \rightarrow \text{Matrix } (-O)_n\ M\ R_{m-n}X_p + m\ RH \tag{4}$$

wherein M, R, X, $m$ and $p$ have the meanings previously ascribed to them and $n$ is an integer being not more than $(m-1)$. It has been found that when the defined components of our transition metal compositions are reacted, all except one of the hyrdocarbon groups of the organometallic compound may be displaced by —OH groups of the matrix, so that there is at least always one hydrocarbon group attached to the transition metal in the product. This appears to be independent of the number of reactable hydroxylic groups (as hereinafter defined) present on the surface of the matrix.

The term Matrix $(-OH)_n$ represents an inert matrix having at least $n$ reactable hydroxylic groups attached to its surface. The number of reactable hydroxylic groups, that is, the number available for our reaction, will depend on the nature and condition of the matrix material. For example, in some materials, because of their molecular configuration, some of the hydroxylic groups present are not reactive under our conditions. Thus it is usual to react the matrix, at least initially, with an excess of transition metal complex, so that the number of hydroxylic groups available for the reaction may be determined.

The progress of the reaction in the manner indicated in equation (4) above may be readily followed by evolution of free hydrocarbon RH and by a colour change in the reactants. The fact that the product is a chemical entity, not a physical mixture, i.e. a transition metal complex physically adsorbed on a granular matrix, may be demonstrated by removing the product, a coloured, insoluble composition, from the reactants and washing it with a solvent which would remove any adsorbed complex from the matrix. When this is done, the complex remains on the matrix. Contrary to this, when our complexes are mixed with an inert matrix containing no reactive hydroxylic groups, for example silica which has been calcined at 1200° C, although the complex is adsorbed on the matrix, it is readily removed by washing the product with a solvent.

As previously mentioned, the number of reactive hydroxylic groups present in a given weight of matrix will depend upon its nature (for example, whether it is silica or alumina) and its condition (for example, its surface area and the treatment it has received to remove adsorbed water). Thus the precise composition of transition metal compositions according to our invention may vary from one batch or sample to another of the same matrix material; but successive portions of the same material prepared under identical conditions will give products having the same composition.

Compositions according to the present invention may be prepared by contacting a solution of the transition metal complex with a suitable matrix material, in the absence of free or adsorbed water. The solvent used for the complex should be dry and inert; hydrocarbon solvents are preferred. Since many of the transition metal complexes which may be used in our process are thermally unstable, the reaction temperature must be maintained low enough to avoid decomposition of the complex. With some complexes, temperatures below 0° C are required.

The ratio of transition metal organometallic complex to matrix material may be varied within wide limits depending upon the physical and chemical nature of the components used; but it is preferred that the proportions are chosen so that each reactable hydrocarbon group reacts with a hydroxylic group.

Two methods of preparing transition metal compositions according to our invention, which allow precise and reproducible control of the composition (within the provisos mentioned above) will now be described. A first method comprises suspending the matrix material, which has previously been freed from water, in an inert liquid, and titrating the reactable hydroxylic groups with a solution of the transition metal complex in an inert solvent. Since most transition metal complexes are strongly coloured, the end-point is readily detectable by the presence of a permanent colouration in the suspending solvent. In compositions prepared in this way, all the reactable hydroxylic groups of the matrix are reacted with the metal complex. The compositions produced may then be recovered by filtration from the reaction medium, freed from solvent and stored dry or under solvent in oxygen-free conditions.

It is possible to add less than the complete titre of transition metal complex, or even to add excess transition metal complex, but when excess complex is used, it will remain in the reaction medium when the composition is separated.

A second method for preparing compositions according to our invention comprises, first, adding excess of either transition metal complex or a Grignard reagent (magnesium hydrocarbyl compound) to the matrix material, determining the number of molecules of hydrocarbon liberated, and then adding to a further sample of the matrix material just sufficient of the appropriate transition metal complex to liberate an equivalent amount of hydrocarbon. For example, a sample of the matrix material may be suspended in a solvent and excess of a transition metal $\pi$-allylic compound added. The volume of propylene produced is measured and related to the weight of matrix material. A second sample of the matrix material is then taken and a transition metal $\pi$-allylic compound added until the volume of propylene produce per gram of matrix material present is equivalent to that determined by addition of excess transition metal complex.

As already mentioned, the compositions may be separated from the media in which they are produced and exist as chemical entities of definite composition. In many cases they are more thermally stable than the transition metal complexes from which they are produced. For example, $Zr(\pi\text{-allyl})_3Br$ decomposes at $-20°$ C whereas an equivalent composition according to our invention formed by reacting $Zr(\pi\text{-allyl})_3Br$ with silica is stable up to 60° C.

We have also discovered that certain of the compositions defined above may be used as initiators for the polymerisation of olefinically unsaturated monomers. In this specification we intend the term "polymerisation" to mean the formation of high molecular weight polymers and we also intend the term to exclude obligomerisation to low molecular weight materials.

The invention is illustrated by the following Examples

EXAMPLE 1

An inert matrix material comprising hydrated precipitated silica (Manosil VX3 supplied in UK by Hardman and Holden Ltd.) having a particle size in the range 15 to 20 millimicrons was heated at 200° C for 2 hours at a pressure less than $10^{-4}$ torr to free it from adsorbed water. After treatment, the available surface hydroxyl content was measured by addition of excess methyl magnesium iodide. The amount of methane evolved was 0.86 millimoles per gram of silica.

On addition of excess tetrakis($\pi$-allyl zirconium to a suspension of similarly prepared silica in toluene, 0.86 millimoles of propylene was evolved per gram of silica. Step-wise addition of the zirconium complex to the silica showed that two molecules of propylene were evolved per molecule of zirconium complex.

A transition metal composition was prepared by adding 0.43 millimoles of tetrakis($\pi$-allyl) zirconium to a suspension of dried silica (1 g. prepared as above) in toluene. The dark red colour of the zirconium compound was discharged and a green coloured zirconium composition was obtained. The composition was stored in a dry inert atmosphere either under toluene or free from liquid.

Thus, addition of only x millimoles of tetrakis($\pi$-allyl)zirconium, where $x$ <0.43, to 1 gram of silica would give rise to $x$ millimoles of the composition, together with inert silica matrix having ($y-2x$) available, but unreacted, hydroxyl groups where $y$ is the available hyroxyl content per gram of silica.

EXAMPLE 2

A sample of silica (1 g.) prepared as described in Example 1 was suspended in toluene. The reactable hydroxyl groups were titrated with a solution of tris($\pi$-allyl)zirconium bromide in toluene. It was found that 0.43 millimoles could be added before the supernatant liquid became coloured. The zirconium composition obtained was brown.

Further samples of transition metal composition according to our invention were prepared by addition of a solution of tris($\pi$-allyl) zirconium bromide to prepared silica suspended in toluene at the rate of 0.43 millimoles of zirconium compound per gram of silica.

EXAMPLES 3-5

The following compositions according to our invention were made by the procedure of Example 1 using the same matrix material. The appropriate details are summarised below in Table 1.

TABLE 1

| Example No. | Components of the Composition | Colour | n* |
|---|---|---|---|
| 3 | Cr(methyallyl)$_3$—SiO$_2$ | brown | 2 |
| 4 | Hf($\pi$—allyl)$_4$—SiO$_2$ | brown | 2 |
| 5 | Zr($\pi$—allyl)$_3$Br$_1$—SiO$_2$ | brown | 1 |

*Number of mols. of propylene evolved by each mol. of transition metal complex reacted with SiO$_2$.

EXAMPLE 6

A high purity $\gamma$ alumina (supplied by Koninklijke Zwavelzuurfabrieken v/h Ketjen NV) was freed from water by heating at 600° C for 2 hours under a vacuum of at least $10^{-4}$. It was then cooled under an atmosphere of dry nitrogen and suspended in dry oxygen-free benzene.

A sample of the suspension was titrated with a solution of zirconium tetrabenzyl in benzene, the end point being indicated by a permanent colour in the suspending solvent. Step-wise addition of the same zirconium complex to a further sample of the alumina suspensions showed that two molecules of toluene were evolved per molecule of zirconium complex.

A zirconium tetrabenzyl composition was prepared by adding 0.4 millimoles of zirconium tetrabenzyl per gram of dried alumina suspended in toluene. The yellow colour of the zirconium tetrabenzyl was discharged from the toluene and a yellow coloured composition was obtained.

EXAMPLE 7

A zirconium tetrakis($\pi$-allyl)-alumina composition was prepared by adding 0.4 millimoles of the zirconium complex per g. of dried alumina as described in Example 6. The composition was green in colour and two moles of propylene were evolved per zirconium atom during the preparation.

EXAMPLES 8 and 9

The procedure of Example 7 was repeated using as complex niobium tetrakis($\pi$-allyl) and molybdenum($\pi$-allyl) respectively. In Example 8 the complex was blue and the composition brown; in Example 9 the complex was blue/green and the composition brown.

What we claim is:
1. A transition metal composition, useful as an initiator for the polymerization of olefins, which is the product obtained by mixing together under dry and oxygen-free conditions a transition metal complex of the general formula

$$R_mMX_p$$

with a substantially inert inorganic matrix material having a plurality of —OH groups attached to the surface of the matrix material, the hydrogen atoms of the —OH groups being capable of acting as proton sources, said matrix material being free from adsorbed water, wherein M is a transition metal of Groups IVA to VIA of the Periodic Table of the Elements, R is a hydrocarbon group or —CH$_2$Y where Y is —Z (R$^1$)$_3$ where Z is silicon, germanium, tin or lead and R$^1$ is hydrogen or hydrocarbon, X is a halogen and m and p are integers, m having a value from 2 to the highest valency of the metal M and p having a value from 0 to 2 less than the valency of the metal M, except when M is a metal of Group VIA when p is 0.
2. A composition as claimed in claim 1 in which at least one of the hydrocarbon groups R is $\pi$-allyl or $\pi$-methylallyl.
3. A composition as claimed in claim 2 in which the transition metal complex is selected from the group consisting of tetrakis($\pi$-allyl) zirconium and hafnium, tris($\pi$-allyl) chromium, tetrakis($\pi$-methallyl) zirconium and hafnium, tris($\pi$-methylallyl) chromium and zirconium tris($\pi$-allyl) bromide.
4. A composition as claimed in claim 1 in which at least one R has the formula —CH$_2$Y' sigma-bonded to the metal M, where Y' is a mono- or di-cyclic aryl group composed of hydrogen and carbon, cycloalkenyl, halogen or the group Z(R$^1$)$_3$ where Z represents silicon, germanium, tin or lead, and R$^1$ is hydrocarbon or hydrogen.
5. A composition as claimed in claim 4 in which —CH$_2$Y is selected from the group consisting of benzyl, 1-methylene-1-naphthyl, p-methyl benzyl and trimethylsilymethylene.
6. A composition as claimed in claim 5 in which the transition metal complex is selected from the group consisting of zirconium and titanium tetra(benzyl), tris(benzyl)zirconium chloride, zirconium tetrakis(p-methyl benzyl), zirconium and titanium tetrakis(1-methylene-1-naphthyl) and zirconium tetrakis(trimethylalkylmethylene).
7. A composition as claimed in claim 1 in which the inert matrix material is selected from the group consisting of silica, alumina and mixtures thereof.
8. A process for the preparation of a composition as claimed in claim 1, which comprises mixing together under dry and oxygen-free conditions a transition metal complex of the general formula $$R_mMX_p$$

with a substantially inert inorganic matrix material having a plurality of —OH groups attached to the surface of the matrix material, the hydrogen atoms of the —OH groups being capable of acting as proton sources, said matrix material being free from adsorbed water, wherein M is a transition metal of Groups IVA to VIA of the Periodic Table of the Elements, R is a hydrocarbon group or —CH$_2$Y where Y is —Z (R$^1$)$_3$ where Z is silicon, germanium, tin or lead and R$^1$ is hydrogen or hydrocarbon, X is a halogen and $m$ and $p$ are integers, $m$ having a value from 2 to the highest valency of the metal M and $p$ having a value from 0 to 2 less than the valency of the metal M, except when M is a metal of Group VIA when $p$ is 0, the proportions of transition metal complex and inert matrix material being chosen so that each reactable hydrocarbon is reacted with a hydroxylic group of the matrix material.

9. A process as claimed in claim 8 in which the matrix material is freed from adsorbed water, suspended in an inert liquid and titrated with a solution of the transition metal complex in an inert solvent until all the reactable hydroxylic groups of the matrix material have been reacted.

10. A process as claimed in claim 8 in which, firstly, an excess of a transition metal complex or a Grignard reagent is added to one portion of a matrix material previously freed from adsorbed water and the number of molecules of hydrocarbon evolved measured and, secondly, sufficient of an appropriate transition metal complex is added to a second portion of the same matrix material to liberate an equivalent amount of hydrocarbon.

11. A composition as claimed in claim 1 wherein the matrix material is silica, alumina or mixture thereof and the transition metal complex is selected from the group consisting of tetrakis($\pi$-allyl) zirconium and hafnium, tris ($\pi$-allyl) chromium, tetrakis ($\pi$-methallyl) zirconium and hafnium, tris($\pi$-methylallyl) chromium, zirconium tris($\pi$-allyl) bromide, zirconium and titanium tetra(benzyl), tris(benzyl)zirconium chloride, zirconium tetrakis(p-methyl benzyl), zirconium and titanium tetrakis(1-methylene-1-naphthyl) and zirconium tetrakis (trimethylalkylmethylene).

* * * * *